W. F. STIMPSON.
COMPUTING SCALE.
APPLICATION FILED FEB. 8, 1915.
1,403,208.
Patented Jan. 10, 1922.
3 SHEETS—SHEET 2.
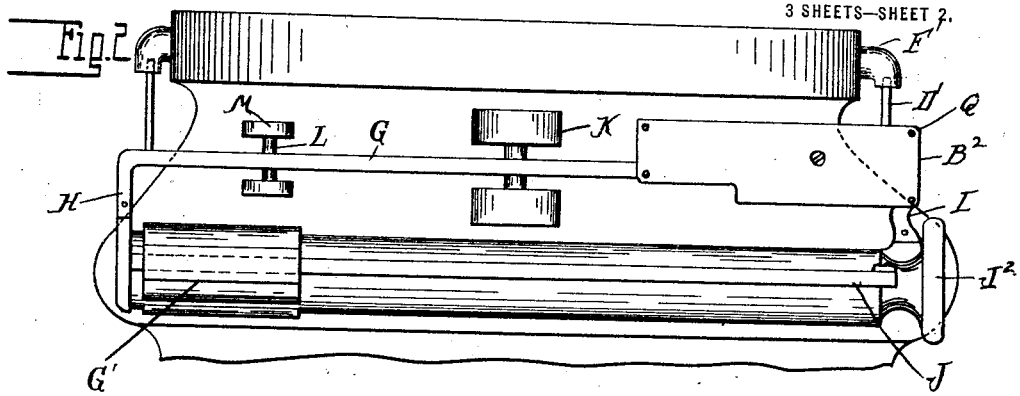
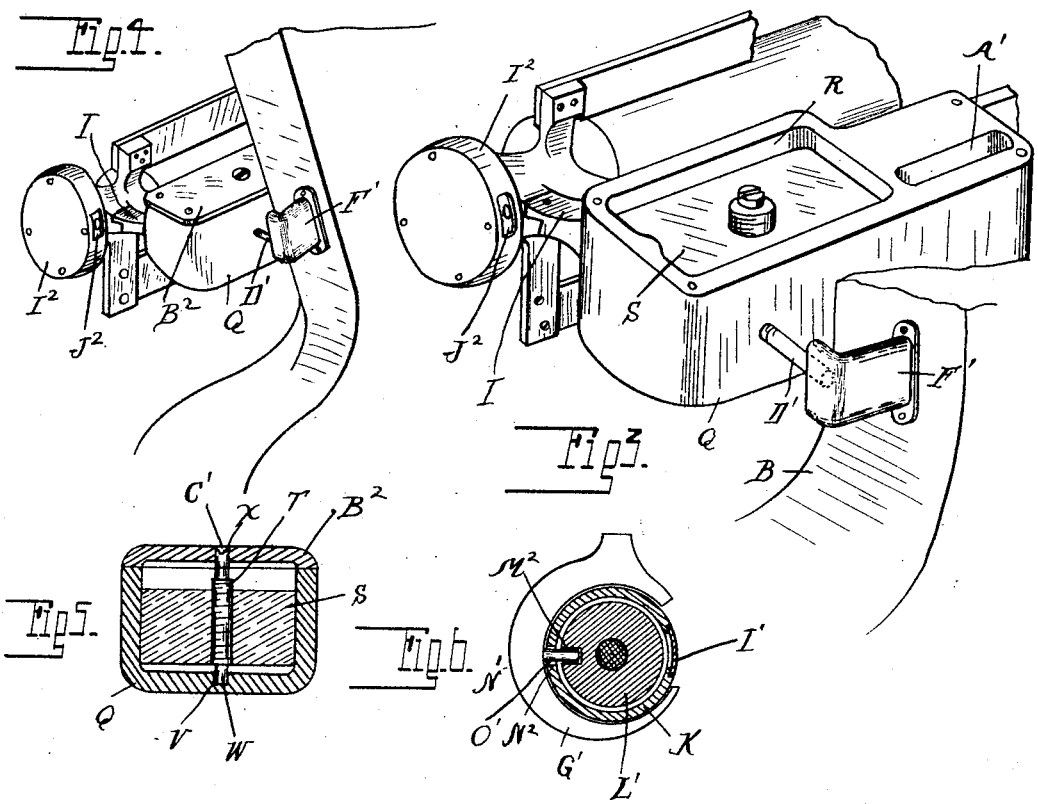
WITNESSES:
W. K. Ford
James P. Barry
INVENTOR
Walter F. Stimpson
BY
Whittemore Hulbert & Whittemore
ATTORNEYS

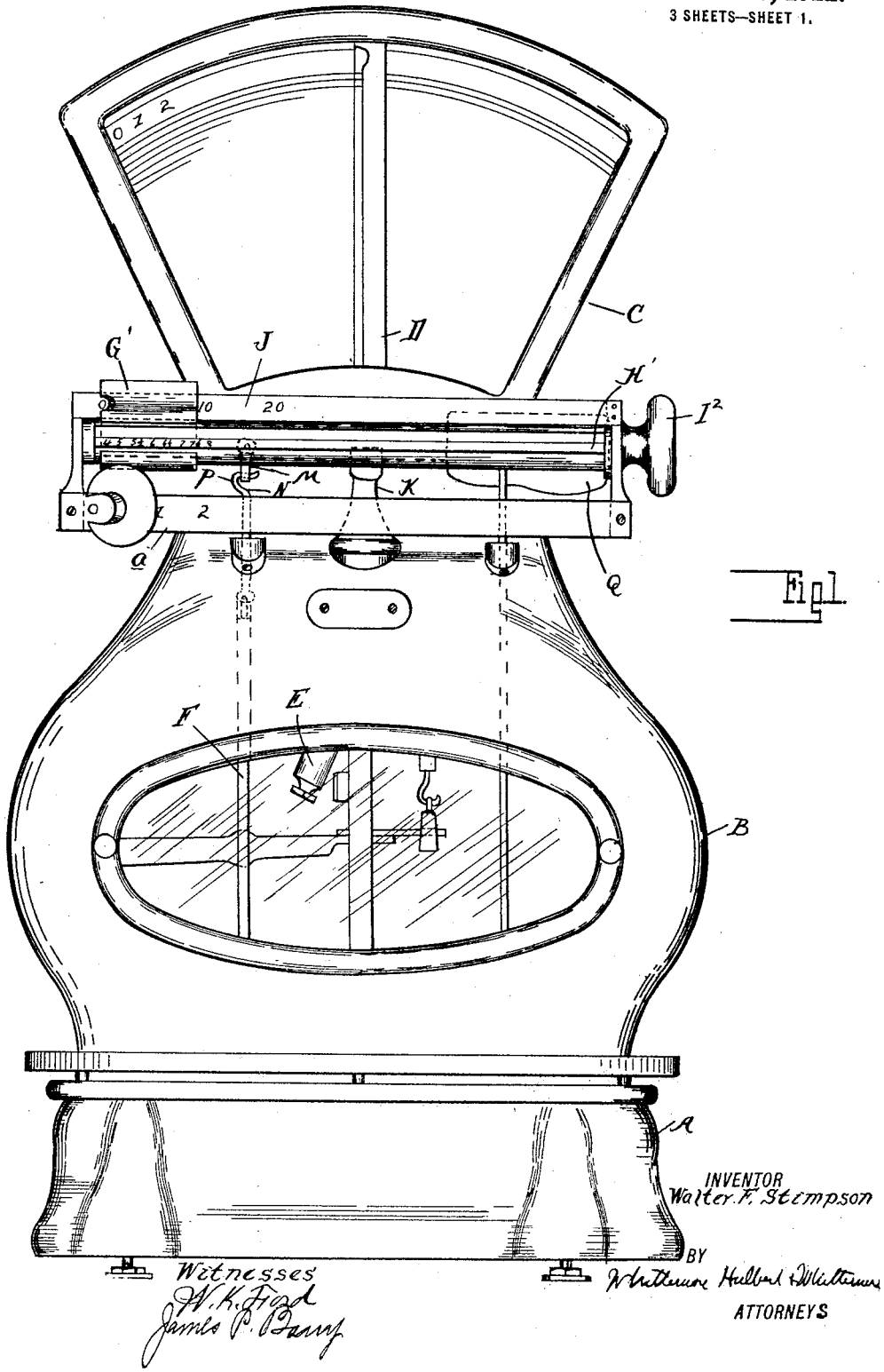

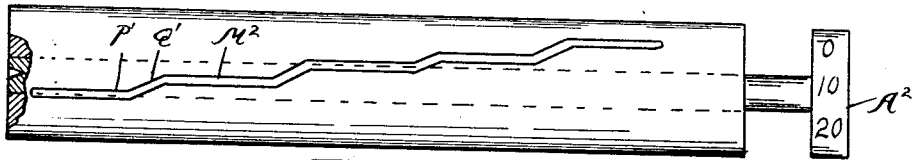
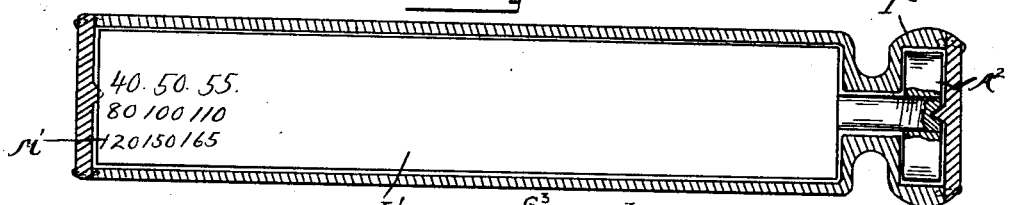
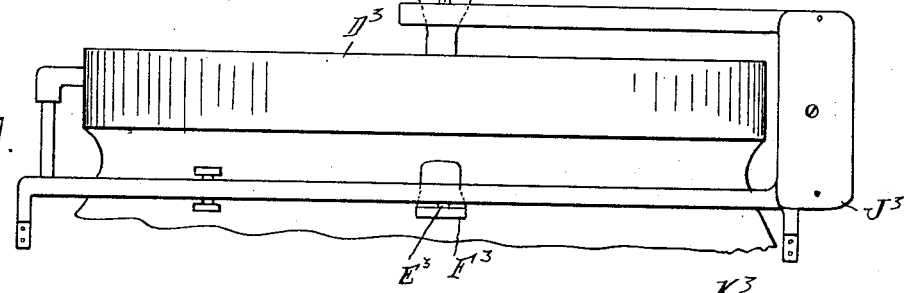
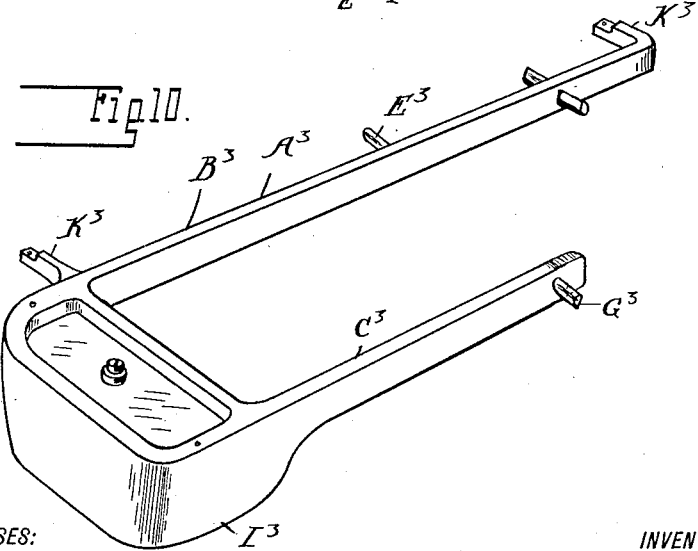

UNITED STATES PATENT OFFICE.

WALTER F. STIMPSON, OF DETROIT, MICHIGAN.

COMPUTING SCALE.

1,403,208. Specification of Letters Patent. Patented Jan. 10, 1922.

Application filed February 8, 1915. Serial No. 6,794.

*To all whom it may concern:*

Be it known that I, WALTER F. STIMPSON, a citizen of the United States of America, residing at Detroit, in the county of Wayne and State of Michigan, have invented certain new and useful Improvements in Computing Scales, of which the following is a specification, reference being had therein to the accompanying drawings.

The invention relates to automatic computing scales, and resides in the novel construction and arrangement of the weighing beam; in the computing device for the weighing beam; and further, in certain details of construction and combinations and arrangement of parts as will more fully hereinafter appear.

In the drawings,—

Figure 1 is a front elevation of a scale embodying the invention;

Figure 2 is a top plan view thereof;

Figures 3 and 4 are fragmentary perspective views illustrating certain details of construction;

Figure 5 is a section through a portion of the weighing beam;

Figure 6 is a section on the line $x$—$x$ of Fig. 2;

Figures 7 and 8 illustrate a computing chart;

Figure 9 shows a modified construction of computing device; and

Figure 10 is a perspective view of the computing device.

Referring to the construction shown in Figures 1 to 8 inclusive. A designates the base frame and B an upward extension thereof carrying the indicating section C of the computing type. D is the index hand, E the pendulum weight therefor connected by means of suitable lever mechanism to be operated from the platform levers, and F is a steelyard rod connecting the platform levers and the weighing beam lever G. The lever G has outwardly-extending arms H and I at the opposite ends thereof carrying the weighing beam proper J, and also a tare beam $a$. The beam lever G is fulcrumed on a bearing K on the exterior of the upward extension B and is provided with a knife-edge bearing L at one side of the fulcrum, upon which is pivoted a stirrup M. N is an extension of the steelyard rod that projects through an opening in the upward extension B and has a hook-shaped portion P at its upper end engaging the stirrup M. Arranged upon the side of the fulcrum K opposite from the stirrup M is a weight section Q. The latter preferably is composed of an enlarged chamber R within which is arranged a suitable weight as S that is adjustable in order to properly balance the weighing lever G. In the construction shown the weight S is provided with a threaded aperture for receiving the threaded portion T of the adjusting member, the lower end W of which engages a bearing V in the bottom of the chamber R. The upper end X of the adjusting member is slotted to receive a screw driver or other suitable tool. Thus by adjusting the member T the weight S may be raised or lowered. Preferably the member Q is provided with a second or similar chamber A' for receiving the sealing weight. $B^2$ is a cover for closing the chambers R and A' and preferably the latter has an aperture C' therein within which is arranged the upper end of the adjusting member, as shown in Figure 5. In order to limit the movement of the weighing beam lever the latter is provided with forwardly-extending arms D' having their ends arranged to travel in elongated guides F' attached to the sides of the upwardly-extending portion B.

The weighing beam is provided with a computing chart so that not only may the extra weight be indicated but also the value for the additional weight be computed. Thus G' designates a weight mounted upon the beam J for longitudinal sliding movement, the latter having the usual weight indications as 10, 20, etc., thereon. Carried by the arms H and I is a casing K', and within this casing is journalled a cylinder L'. The latter is provided with a plurality of rows of computations as M' for giving the value at the various prices per pound for the additional weight added to the weighing beam. For instance, one of the rows M' is computed for 10 pounds, the next adjacent row for 20 pounds, etc. These rows occupy about one-half of the circumference of the roll, and the other side of the roll is provided with a guide slot $M^2$ within which travels a pin or projection O' of the weight G'. The latter preferably has an extension shaped to embrace the cylinder casing K', as shown in Figure 6. The pin O' is arranged upon the extension N' and passes through a straight slot $N^2$ in the casing. Upon the casing at the sight opening is arranged a stationary row H' for prices per pound. In order that the roll L' may not be turned until the weight registers with the indications 10, 20, etc., upon the beam J, the guide slot M² has straight portions P' that are connected by abrupt diagonal portions Q' as shown in Figure 6, instead of forming the guide slot M² of a uniform spiral. The arrangement and construction of the guide slot however, may be as desider, though for the particular arrangement shown in Figs. 7 and 8, the form of the slot illustrated is most suitable.

By the arrangement so far described, if the 15 pound weight is placed upon the platform, the operator moves the weight G' until it registers with the numeral 10 upon the beam J. The computing chart C will then compute for the weight of the article over 10 pounds, in the instance given 5 pounds, while the computing roll for the tare beam will be automatically turned upon the shifting of the weight G' to the present to the sight opening I' in the casing K' the proper row of computations. To obtain the total of the article being weighed, is is merely necessary to ascertan the proper computation upon the computing device for the beam and add it to the proper computation upon the computing chart C.

Preferably in the construction described, the roll is provided with a head A² positioned in the extension I² of the casing and the extension has a sight opening J² therein upon the side opposite to the transparent panel or sight opening I' for displaying figures upon the head A² corresponding to the weight indications 10, 20, etc. upon the beam J. This will indicate to the customer the position of the weight upon the beam J whenever the weight has been shifted.

In the construction shown in Figs. 9 and 10, the weighing beam lever A³ comprises two arms, viz: B³ and C³ arranged upon opposite sides of the chart D³. E³ is a pivot engaging a bracket F³ on the upward extension of the casing, and G³ is a pivot on the arm C³ engaging a bearing H³ on the front of the upward extension. The arms B³ C³ are connected by means of a weight chamber I³ closed by a cover J³ in a manner similar to the construction of weight chamber shown in Figures 3, 4 and 5. The tare beam and computing chart are carried by the arms K³.

The construction just described is very desirable since it prevents the tipping of the weighing lever upon its bearings when a comparatively large weight is used on the weighing beam.

What I claim as my invention is:—

1. In a scale the combination of a weighing beam lever, said lever having laterally-extending arms, a weighing beam carried by said arms, a tare beam supported by said arms, and a computing section for the beam including a casing arranged between said beams having a sight opening therein, an adjustable roll mounted in said casing, a weight upon the weighing beam movable longitudinally thereof, and means for adjusting the roll upon a longitudinal movement of said weight.

2. In a scale the combination of a weighing beam lever, said lever having rearwardly-extending arms, a casing carried by said arms having a sight opening therein, a roll arranged in said casing having computations thereon adapted to be brought into registration with said sight opening, a weighing beam carried by said arms, a weight upon said beam movable longitudinally thereof, a connection between said weight and said roll for rotating the latter upon the longitudinal movement of the former, and a tare beam arranged beneath said casing and supported by said arms.

3. In a scale the combinatin with a weighing beam, a casing arranged substantially parallel with the weighing beam, a roll mounted in said casing for rotation having thereon a series of rows of computations, said casing being provided with a sight opening with which said rows of computations are adapted to be brought into registration upon the rotation of the roll, and a weight movable longitudinally of the beam and having a portion embracing the casing, said roll being provided with a guide slot, and a pin upon the portion of the weight embracing the casing engaging said guide slot, for the purpose described.

4. In a scale, a weighing beam lever having an enlarged portion provided with a chamber, a threaded adjusting member mounted in said chamber, a weight arranged in said chamber having a threaded aperture engaging the adjusting member, a closure for said chamber having an aperture adapted to receive the outer end of said adjusting member.

5. In a scale, a weighing beam lever provided with an enlarged portion having a chamber, a balancing weight arranged in said chamber, said enlarged portion being provided with a second chamber for receiving a sealing weight, and a cover for closing both of said chambers.

6. In a scale, the combination with the frame including an upwardly-extending section, a weighing beam lever fulcrumed upon the upwardly-extending section, a weighing beam arranged to one side of said lever, an arm extending laterally from said lever, and a guide upon the upwardly-extending section for said arm.

7. In a scale, the combination with the frame including an upwardly-extending section, a weighing beam lever fulcrumed upon the upwardly-extending section, a weighing beam arranged to one side of said lever, members extending laterally from adjacent opposite ends of said lever, and guides adjacent opposite sides of the upwardly - extending section for said members.

8. In a scale, the combination with the frame including an upwardly-extending section, of a weighing beam lever having portions fulcrumed upon opposite sides of the upward extension, and a weight chamber connecting said portions.

9. In a scale, the combination with the frame including an upwardly-extending section, of a weighing beam lever having portions fulcrumed upon opposite sides of the upward extension, and a weight chamber cast integral with and connecting the ends of said portions.

10. In a scale, the combination with a frame including an upwardly extending section having an indicating portion, a weighing beam lever comprising two arms positioned respectively upon opposite sides of said indicating portion, and a weighing beam and computing device therefor, carried by one of said arms.

11. In a scale, the combination with a frame including an upwardly extending section having an indicating portion, a weighing beam lever comprising two arms positioned respectively upon opposite sides of said indicating portion, a weighing beam and computing device therefor carried by one of said arms, a counterpoise movable longitudinally upon said weighing beam, and means for adjusting said computing device upon a longitudinal movement of the counterpoise.

12. In a scale, the combination with a frame including an upwardly extending section having an indicating portion, a weighing beam lever comprising two arms positioned respectively upon opposite sides of said indicating portion, a weighing beam carried by one of said arms, and an indicating device for said beam carried by said lever, including a roll extending substantially parallel with the beam.

13. In a scale, the combination with a frame including an upwardly extending section having an indicating portion, a weighing beam lever comprising two arms positioned respectively at each side of said indicating portion, a weighing beam and computing device therefor carried by one of said arms, said device comprising a casing having a sight opening therein, a roll revoluble within said casing carrying indicia registrable with said sight opening, a weight movable longitudinally upon the weighing beam, and a connection between said roll and weight for adjusting the former upon a movement of the latter.

14. In a scale, the combination with the weighing beam thereof, and a weight adjustable upon said weighing beam, of an indicating device for said weighing beam comprising a casing having a longitudinally extending sight window, and an enlarged portion at one end formed with a second sight window, an indicating roll within said casing provided with cost indicia registrable with the first mentioned window and having a head located within said enlarged portion of the casing carrying weight indicia registrable with the second window.

15. In a scale, the combination with an indicating cylinder and an indicating member within said cylinder, of a poise member embracing said cylinder, and means for adjusting said indicating member upon a movement of the poise member longitudinally of the cylinder.

In testimony whereof I affix my signature in presence of two witnesses.

WALTER F. STIMPSON.

Witnesses:
Wm. J. Belknap,
James P. Barry.